(12) United States Patent
Beaucage

(10) Patent No.: US 7,801,166 B2
(45) Date of Patent: Sep. 21, 2010

(54) RUGGEDIZED ANALOG FRONT-END FOR A NETWORK COMMUNICATIVE DEVICE IN A RAILWAY-LIKE ENVIRONMENT

(75) Inventor: Jean Beaucage, LeGardeur (CA)

(73) Assignee: Alstom Canada Inc., Montreal, Quebec (CA)

( * ) Notice: Subject to any disclaimer, the term of this patent is extended or adjusted under 35 U.S.C. 154(b) by 379 days.

(21) Appl. No.: 10/585,270

(22) PCT Filed: Jan. 6, 2005

(86) PCT No.: PCT/CA2005/000005

§ 371 (c)(1),
(2), (4) Date: May 27, 2008

(87) PCT Pub. No.: WO2005/067142

PCT Pub. Date: Jul. 21, 2005

(65) Prior Publication Data

US 2008/0298384 A1    Dec. 4, 2008

(30) Foreign Application Priority Data

Jan. 7, 2004    (CA) .................................. 2454988

(51) Int. Cl.
   *H04L 12/413*    (2006.01)
(52) U.S. Cl. .................. 370/445; 370/468; 370/490; 370/474
(58) Field of Classification Search ......... 370/230–253, 370/401, 465, 354, 352, 353, 468; 709/203, 709/225, 223, 238, 202
See application file for complete search history.

(56) References Cited

U.S. PATENT DOCUMENTS

| 3,603,744 | A | * | 9/1971 | Krasin et al. ................. 370/488 |
| 5,544,243 | A | * | 8/1996 | Papadopoulos ............. 379/413 |
| 6,212,263 | B1 | | 4/2001 | Sun et al. |
| 6,400,281 | B1 | * | 6/2002 | Darby, Jr. et al. ........... 340/933 |
| 6,546,016 | B1 | * | 4/2003 | Gerszberg et al. ........... 370/401 |
| 6,631,120 | B1 | * | 10/2003 | Milbrandt ................... 370/252 |
| 2003/0095036 | A1 | * | 5/2003 | Wasaki et al. .......... 340/310.01 |
| 2003/0211782 | A1 | | 11/2003 | Esparaz et al. |

FOREIGN PATENT DOCUMENTS

EP    1 265 442 A1    12/2002
WO    WO 98/51081    11/1998

OTHER PUBLICATIONS

Homelan Magnetics 10 Mbps Filter Modules, Bel Fuse Inc. (2001), No. LM00100.

* cited by examiner

*Primary Examiner*—Ricky Ngo
*Assistant Examiner*—Iqbal Zaidi
(74) *Attorney, Agent, or Firm*—Merchant & Gould P.C.

(57) ABSTRACT

A ruggedized analog front-end for interconnecting a network communicative device to a two-conductor based network operable in a train-like or other harsh environment. The front-end has a coupling circuit having first and second coupling channels providing isolation, impedance matching and energy transfer between a common mode filter circuit connectable to the two-conductor based network, and an amplifier and an attenuator respectively connectable to output and input of the network communicative device. The front-end has a power supply circuit for operative power supply of electronic components of the analog front-end.

24 Claims, 7 Drawing Sheets

RUGGEDIZED ANALOG FRONT-END FOR A NETWORK COMMUNICATIVE DEVICE IN A RAILWAY-LIKE ENVIRONMENT

FIELD OF THE INVENTION

The present invention relates to an analog front-end for interconnecting a network communicative device to a two-conductor based network, and a network system operable in a harsh environment like in train or transit vehicle or wayside.

RELATED ART

The majority of the broadband systems on the market are using a train backbone network based on standard Ethernet or an adaptation of Ethernet. Indeed, Ethernet is one of the most used technologies for high-speed applications on-board transit vehicles. However, Ethernet is not able to meet a number of requirements.

Ethernet is a type of networking technology for local area networks. Data is broken into packets and each one is transmitted using the Carrier Sense Multiple Access/Collision Detect (CSMA/CD) algorithm until it arrives at the destination without colliding with any other packet. A node is either transmitting or receiving at any instant. The bandwidth is 10 Mbps or 100 Mbps. The most commonly used Ethernet cables are 10/100 baseT.

Ethernet provides a best effort Quality of Service (QoS). An Ethernet network does not distinguish among packets carrying an emergency message, entertainment video content, or images from CCTV video surveillance cameras. On an Ethernet network, any node may transmit on the network if no other node is using the network. If two or more nodes start the transmission simultaneously (prior to the start of the transmission the network was idle), a collision occurs and the nodes try to retransmit at the same bit rate. The QoS degrades as the number of nodes increases and collisions potentially occur. Furthermore, Ethernet packets are of varying length. A node transmitting a large non-critical file may take over the network, while another node that wants to transmit critical data has to wait. Ethernet does not guarantee that a packet is delivered within a specified time.

In addition, Ethernet introduces the danger of a single point of failure. For example, in the case of a backbone network that passes through multiple cars of a train, if the failure occurs in an Ethernet switch, e.g. a failure in Car 2 as shown in FIG. 2, the entire network is disrupted until that switch is replaced. Although other mechanisms may be implemented to overcome single point of failure (e.g. redundant network, relays, etc.), those mechanisms introduce additional equipment, additional costs and they are subject to failure as well.

Ethernet does not meet the requirements for deploying IP over one existing two-conductor cable on-board rail vehicles. Ethernet requires two pairs of dedicated cables. Ethernet does not work with existing applications over the same cable. It does not support a multi-drop bus communication network. Ethernet networks may be deployed in a star configuration, in a daisy-chained bus configuration, or a mixture of both. But Ethernet networks are not multi-drop. Daisy-chaining is used in the Ethernet bus configuration. Terminating devices are required by Ethernet in bus configurations. Ethernet has a single point of failure, whether in bus or star configuration. It has no high availability and reliability in the harsh railway environment, unless modified. In order to adapt its throughput per the quality of the cable, the noise, the number of devices on the network, etc., higher level protocols are required above Ethernet. It is not able to adapt to arbitrary topologies without degradation of performance.

The HomePNA standard was developed for the home residential market. It uses the existing phone wires in a home to share a single Internet connection with several network devices (e.g. computers, printers, digital audio receivers, media entertainment centers, gateways, etc.) in the home. Several signals may coexist on the same wire: analog voice, xDSL and HomePNA signals. HomePNA 2.0 introduces eight levels of priority and uses a new collision resolution algorithm called distributed fair priority queuing (DFPQ). HomePNA 2.0 supports unicast, multicast, and broadcast transmissions. Unlike Ethernet, HomePNA 2.0 places no restrictions on wiring type, wiring topology or termination. HomePNA 2.0 uses a shared physical medium with no need for a switch or a hub.

Two significant advantages of HomePNA over Ethernet are that HomePNA uses only one two-conductor cable instead of two for Ethernet, and HomePNA may share existing wires where Ethernet may not.

HomePNA is an adaptive technology. When the transmission quality drops, the chipset adapts the transmission speed. The chip support bit rates of 1 Mbps (HomePNA 1.0) and from 4 Mbps (HomePNA 2.0, broadcast) up to 32 Mbps (HomePNA 2.0) in increments of 2 Mbps. This allows quick retransmission of packets at lower speed. Statistically, retries have more chance to be successful at lower speeds. The Ethernet technology performs retries in case of transmissions errors at the same bit rate. The retransmission will be successful only when the perturbation ceases.

Another advantage of the HomePNA over Ethernet is its ability to support dynamic coupling and uncoupling of trains without the hassle of reconfiguration. Both trains may be connected to the same physical wire without intermediate equipment. In addition, Ethernet would require the addition of routers/bridge at each end of the trains, which add equipment and potential single point of failure.

HomePNA 3.0 greatly enhances version 2.0 capabilities adding deterministic QoS support for real-time data. The technology permits users to assign specific time slots for each stream of data guaranteeing that the real-time data will be delivered when it is required with predetermined latency and without interruption. HomePNA 3.0 supports 128 Mbps or more.

Because HomePNA was developed for the residential market, it does not have the robustness, reliability and ruggedness for deployment in the public transit environment, especially in rail cars. Using the HomePNA technology "as is" on-board a train would produce poor results because of the demanding trainborne environment: shocks, vibrations, noises, disturbances, etc. A hardening of the physical layer is necessary. The same applies to the HomePlug standard.

SUMMARY

An object of the invention is to provide a ruggedized analog front-end for interconnecting a network communicative device to a two-conductor based network.

Another object of the invention is to provide such a front-end having higher reliability and data integrity protection.

Another object of the invention is to provide such a front-end increasing signal to noise ratio and common mode filtering and adding more high energy spikes protection, reducing sensitivity to EMI field and providing more differential protection than a prior art design, without affecting a bit rate.

Another object of the invention is to provide a network system operable in a harsh environment e.g. characterized by shocks, vibrations, noises, electromagnetic disturbances, a wide range of operating temperatures, humidity, special power requirements, fire, smoke toxicity, etc.

Another object of the invention is to provide such a network system for railway or other types of transit vehicles or other demanding environments.

Another object of the invention is to provide such a network system which allows re-use of already existing wires as for vehicle refurbishment operations.

According to one aspect of the present invention, there is provided a ruggedized analog front-end for interconnecting a network communicative device to a two-conductor based network, comprising:

input and output leads for connection to the network communicative device;
  network leads for connection to the two-conductor based network;
  a coupling circuit having first, second and third terminal sets, a first coupling channel between the first and second terminal sets, and a second coupling channel between the first and third terminal sets, the first and second coupling channels providing isolation, impedance matching and energy transfer between corresponding ones of the terminal sets;
  an amplifier having an input connected to the input leads, and an output connected to the second terminal set of the coupling circuit;
  a common mode filter circuit coupled between the first terminal set of the coupling circuit and the network leads;
  an attenuator having an input connected to the third terminal set of the coupling circuit, and an output connected to the output leads; and
  a power supply circuit for operative power supply of electronic components of the analog front-end.

According to another aspect of the present invention, there is also provided a network system operable in a harsh environment, comprising:

a pair of conductors forming at least a part of a two-conductor based network;
  at least one network communicative device; and
  at least one access device interconnectable between the pair of conductors and the at least one network communicative device, the at least one access device having a ruggedized analog front-end as defined hereinabove.

BRIEF DESCRIPTION OF THE DRAWINGS

A detailed description of preferred embodiments will be given herein below with reference to the following drawings, in which like numbers refer to like elements.

DETAILED DESCRIPTION OF THE PREFERRED EMBODIMENTS

The railway environment is characterized by shock, vibration, noise, electromagnetic disturbance, wide range of operating temperature ($-25°$ C. to $+70°$ C.), humidity, special power requirements, and other additional requirements (e.g. fire, smoke, toxicity).

The disclosed network system is ruggedized for such a railway environment or other harsh environments sharing similarities with the railway environment. It provides high reliability and high data integrity protection under all the conditions specified above.

Figure 5:
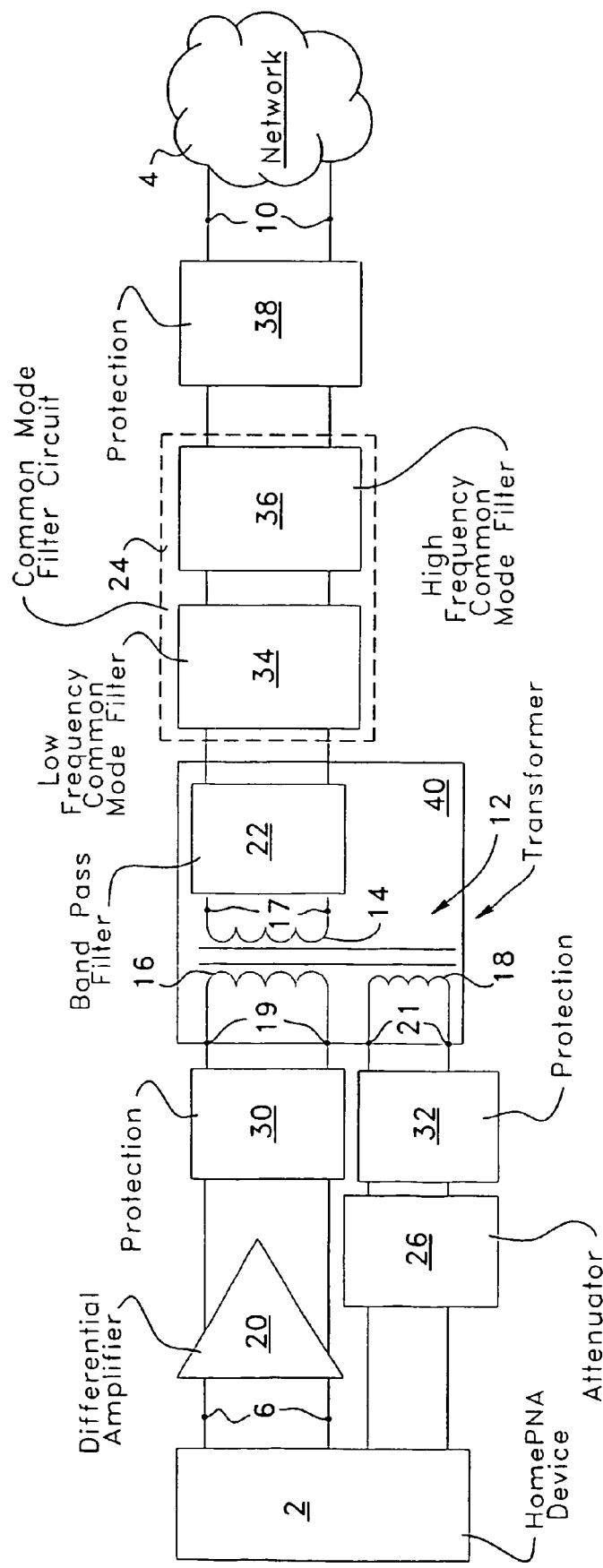
FIG. 5 is a schematic diagram showing the disclosed ruggedized analog front-end.
Figure 6:
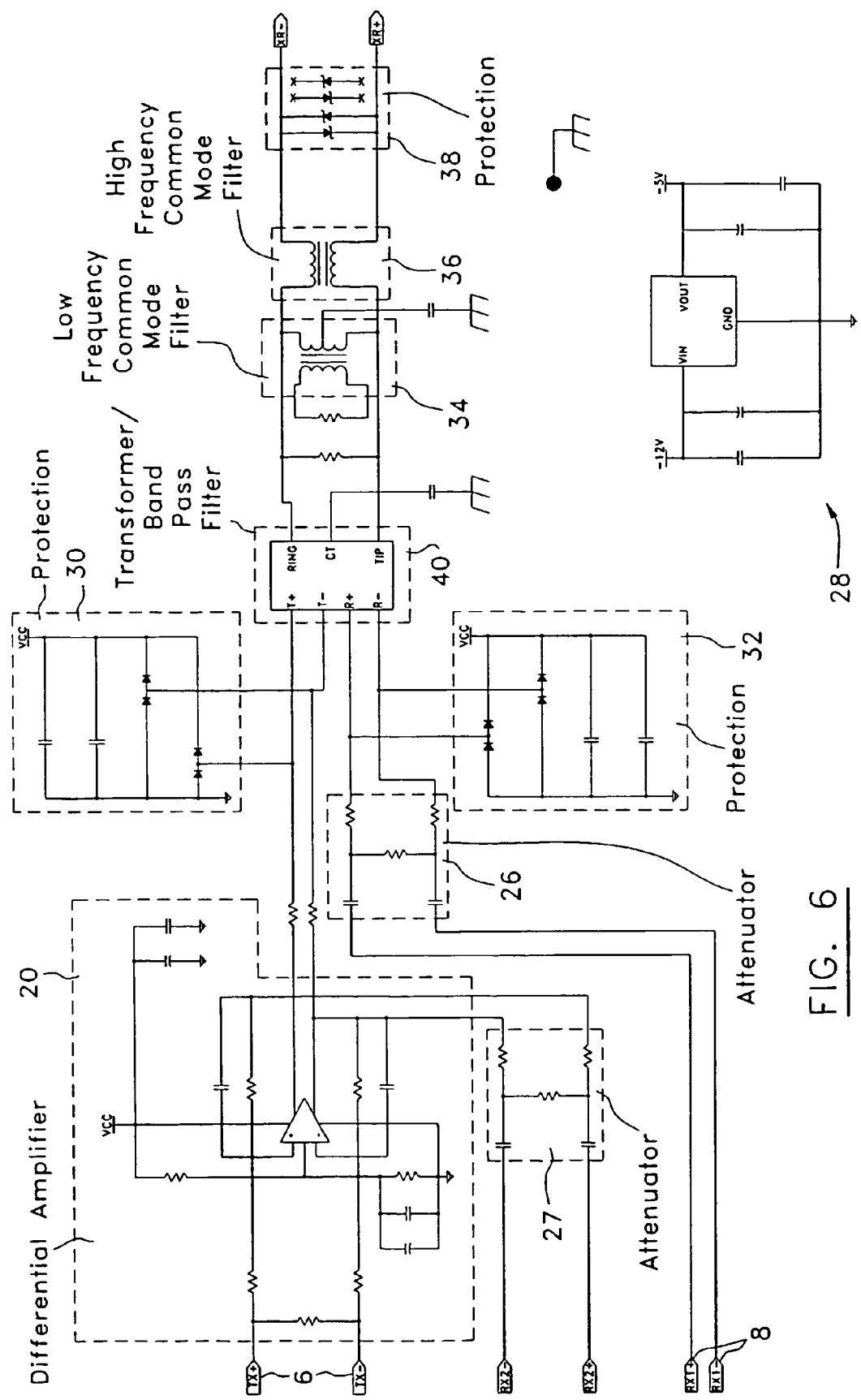
FIG. 6 is a schematic circuit diagram showing the disclosed ruggedized analog front-end.

Referring to FIG. 5, ruggedization is achieved through a ruggedized analog front-end for interconnecting a network communicative device 2, such as a HomePNA device, to a two-conductor based network 4. The front-end has input and output leads 6, 8 for connection to the network communicative device 2. It also has network leads 10 for connection to the two-conductor based network 4. A transformer 12 has a primary coil 14 and first and second secondary coils 16, 18. An amplifier 20 has an input connected to the input leads 6, and an output connected to the first secondary coil 16 of the transformer 12. A common mode filter circuit 24 is coupled between the primary coil 14 of the transformer 12 and the network leads 10. An attenuator 26 has an input connected to the second secondary coil 18 of the transformer 12, and an output connected to the output leads 8. A power supply circuit 28 as shown in FIG. 6 is provided for operative power supply of electronic components of the analog front-end. The front-end is used for both transmitting and receiving.

The transformer 12 embodies a coupling circuit having first, second and third terminal sets 17, 19, 21, a first coupling channel between the first and second terminal sets 17, 19, and a second coupling channel between the first and third terminal sets 17, 21, the first and second coupling channels providing isolation, impedance matching and energy transfer between corresponding ones of the terminal sets 17, 19, 21.

Figure 7:
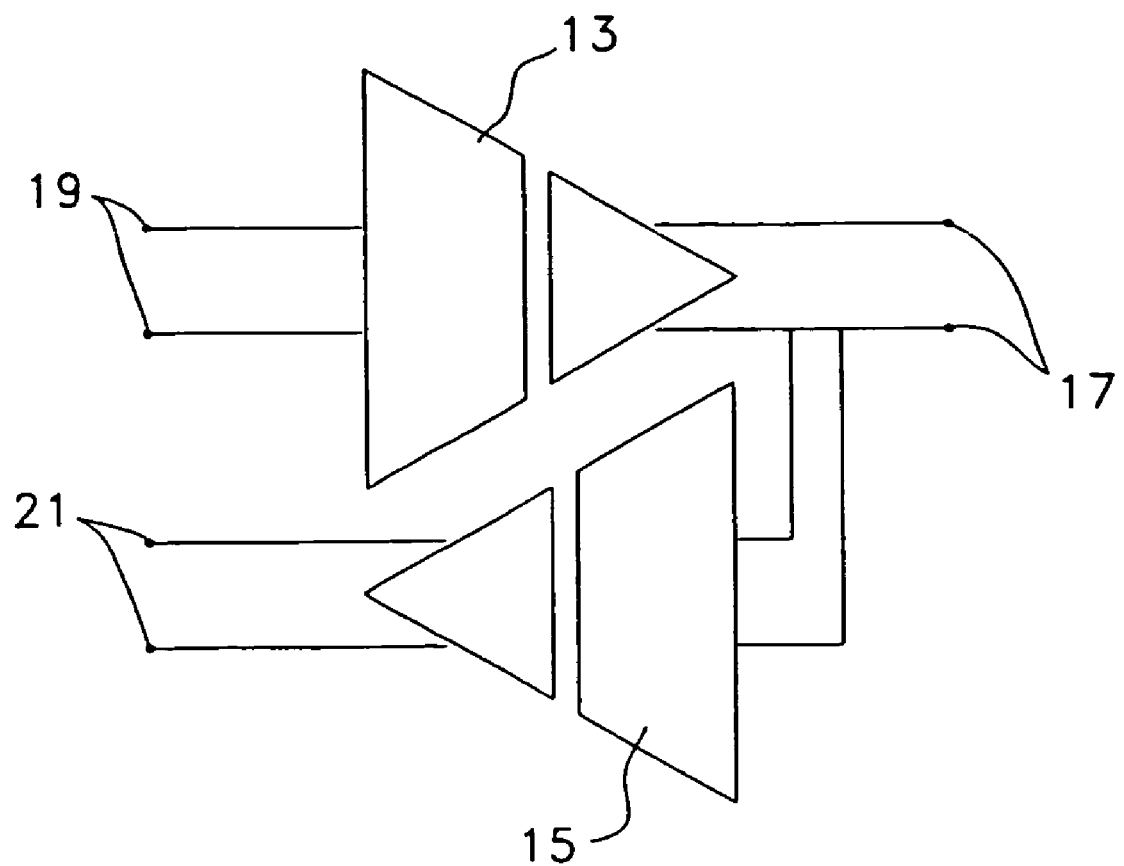
FIG. 7 is a schematic diagram showing a coupling circuit for the disclosed ruggedized analog front-end.

Referring to FIG. 7, the first and second coupling channels could be embodied by an arrangement of opto-isolated amplifiers 13, 15 instead of the transformer 12 (shown in FIG. 6). Other embodiments of the coupling circuit may be used if desired.

The amplifier 20 is preferably a differential amplifier for amplifying a voltage difference between two input signals received by the input leads 6 from the network communicative device 2.

A protection circuit 30 coupled between the output of the amplifier 20 and the first secondary coil 16 of the transformer 12 is preferably provided. As shown in FIG. 6, the protection circuit 30 may consist of a circuit arrangement having diodes and capacitors. A similar protection circuit 32 coupled between the input of the attenuator 26 and the second secondary coil 18 of the transformer 12 is also preferably provided.

A band pass filter 22 coupled between the primary coil 14 of the transformer 12 and the common mode filter circuit 24 is preferably provided. As shown in FIG. 6, the band pass filter 22 and the transformer 12 may conveniently be combined together into a chip 40 (such as EPB5047AS manufactured by the company PCA Electronics inc.) powered by the power supply circuit 28.

The common mode filter circuit 24 is preferably formed of a low frequency common mode filter 34 connected to a high frequency common mode filter 36.

Again, a protection circuit 38 coupled between the common mode filter circuit 24 and the network leads 10 is preferably provided. The protection circuit 38 may consist of a circuit arrangement having zenner diodes for protection in differential mode of signals sent to and received from the two-conductor based network 4.

The differential amplifier 20 receives the signals from the network communicative device 2, amplifies them and sends them through the protection circuit 30. The attenuator 26 attenuates the signals that it receives from the network 4. Because the signals on the network 4 have been amplified, they need to be attenuated before they are sent back to the network communicative device 2. The protection circuits 30, 32 protect the electronics of the entire circuit. The transformer 12 provides the isolation of the signals. It may be combined with the band pass filter 22. The low frequency common mode filter 34 filters the low frequency signals in common mode. It removes the noise generated by the common mode. The high frequency common mode filter 36 filters the high frequency signals in common mode. It removes the noise generated by the common mode. The protection circuit 38 provides protection in differential mode of the signals sent to or received from the network 4.

As shown in FIG. 6, a second attenuator 27 may be connected to the output of the amplifier 20 for transmitting the signals produced by the network communicative device 2 directly to another network communicative device (not shown) without passing by the network 4.

Figure 1:
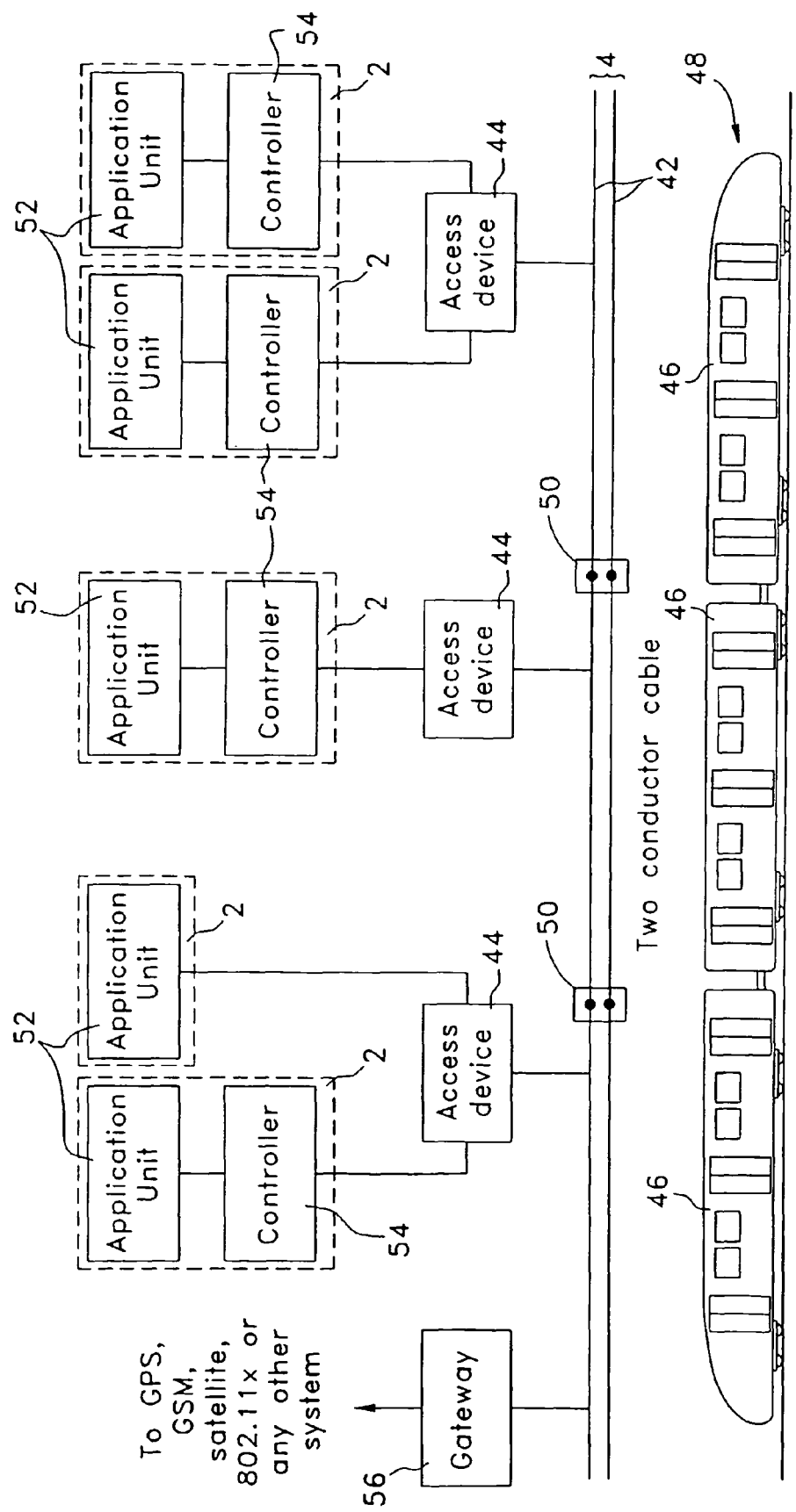
FIG. 1 is a schematic diagram showing the disclosed network system on-board a transit vehicle.
Figure 2:
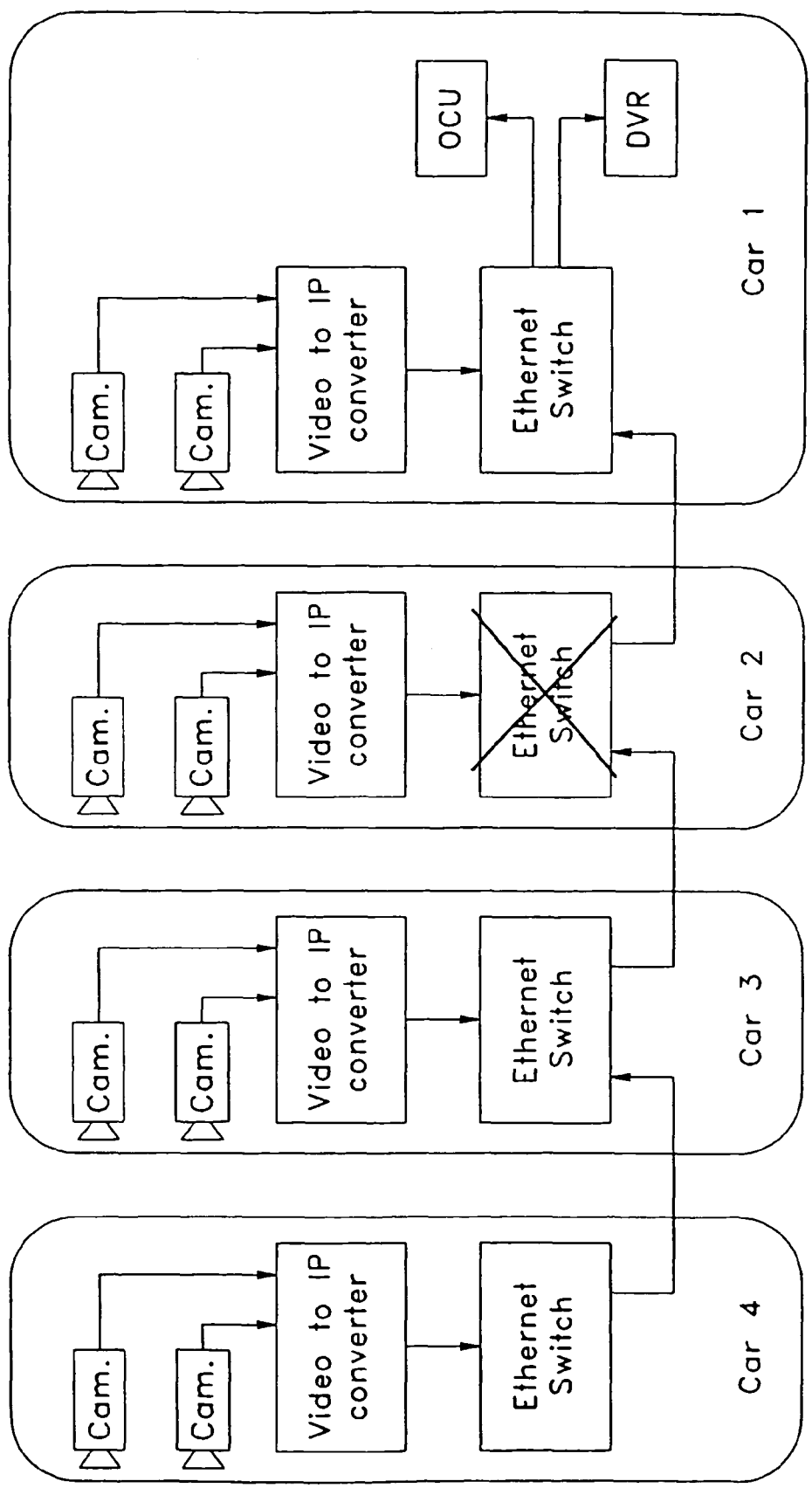
FIG. 2 is a schematic diagram showing a point of failure in an Ethernet network as possible in the prior art.

Referring to FIG. 1, the disclosed network system has a pair of conductors 42 forming at least a part of a two-conductor based network 4, at least one network communicative device 2, and at least one access device 44 interconnectable between the pair of conductors 42 and the network communicative device(s) 2. Each access device 44 has a ruggedized analog front-end as described above. In the illustrated case, the network system has multiple network communicative devices 2 and multiple access devices 44 interconnected between the conductors 42 and a number of the network communicative devices 2 since some of the network communicative devices 2 share a same access device 44.

The conductors 42 may be in the form of a two-conductor cable passing through all or some or one of the cars 46 of a train 48, either directly or via connectors 50 or other couplers/interconnection devices for connection with like pairs of conductors of the two-conductor based network 4. The two-conductor cable may already exist on-board the transit vehicle (refurbishment instances) and it may already be used for other applications. It may also be a newly deployed two-conductor cable. The two-conductor cable is the backbone of the high-speed communication network on-board the transit vehicle. The two-conductor cable may support different communication protocols at Layer 2 or above. The two-conductor cable supports IP data packets. The two-conductor cable may be a twisted pair or another type of cable. However, it is preferable to use a shielded twisted pair cable for high-speed applications on-board trains.

Each network communicative device 2 has an application unit 52 connectable to a corresponding access device 44, for performing an application. The network communicative device 2 may also have a controller 54 for communication of data between the application unit 52 and the two-conductor based network 4. Depending on the application, the controller 54 may be used to control operation of the application unit 52 in response to control signals received on the two-conductor based network 4.

The purpose of the access devices 44 is to allow the controllers 54 to send/receive data to/from the existing or the new two-conductor cable on-board the rail vehicle 46. The access devices 44 may be stand-alone or embedded within the controllers 54. If the controller 54 supports the same communication protocol as the protocol that is used over the high-speed communication backbone 4, then the access device 44 may simply be an Input/Output (I/O) circuit with a front-end within the controller 54. If the controller 54 does not support the same communication protocol as the protocol that is used over the high-speed communication backbone 4, then the access device 44 must be able to convert between one protocol and the other to allow the communication. In such a case, the access device 44 has a conversion functionality for conversion between communication protocols used by the network communicative device 2 and over the two-conductor based network 4.

In the event that several controllers 54 must be connected to the same access device 44 (as in the right-hand side vehicle in the illustrated case), the access device 44 may provide a switching functionality so that the controllers 54 may communicate between one another. The access device 44 provides reliability and robustness in the rail environment via mechanisms such as error correction, automatic adaptation of transmission speed, etc.

The controllers 54 may be considered as the "intelligence" of the application units 52. The controllers 54 may encompass a processor (not shown) as well as the software, firmware and/or hardware that enable the application. The controllers 54 support Internet Protocol (IP) data packets. The controllers 54 may be embedded within the application units 52 or they may be distinct. The controllers 54 may control only the application units 52 connected directly to them, or they may also control other application units 52 in different vehicles via the backbone network 4. The controllers 54 may support interfaces and protocols different than the ones used by the backbone network 4. In such case, the access devices 44 perform the conversion function. In some applications, one controller 54 for the entire train may be sufficient. One controller 54 may be able to support more than one application.

The application units 52 perform the applications required by the end-users. The application units 52 may or may not have an embedded controller 54 and may or may not have an embedded access device 44. If the application units have embedded access devices 44, they may be directly connected to the backbone network 4. A same controller 54 may be shared by a number of application units 52. The application units 52 may be controlled by controllers that reside in other vehicles.

The system may comprise a gateway 56. Some applications require continuous or punctual communication between the vehicles 46 and the ground. In such cases, the gateway 56 may be a stand-alone device connected to the two-conductor cable. The gateway 56 allows the vehicles 46 to communicate with the ground via commercially available or proprietary wireless (or other) communication interfaces, for example GSM, GSM-R, Satellite, IEEE 802.11 a/b/g, radio, leaky cable, etc. The gateway 56 may be stand-alone or it may be embedded within any of the devices 2, 44, 52, 54 of the network 4. For example, it may be embedded within a controller 54. The gateway 56 supports IP data packets from the network backbone 4.

The disclosed system may be deployed over an existing two-conductor cable without interfering with the existing applications. This is particularly an important aspect for refurbished vehicles, where existing cables and available coupler pins are scarce. It may be deployed over a new two-conductor cable. It has the ability to support dynamic coupling and uncoupling of trains without the need for reconfiguration. It is able to support a data rate of several megabits per second (Mbps) or better. It is able to support a multi-drop bus communication network. The length of the bus may reach several hundred feet. It has no daisy-chaining of devices. It does not require any terminating resistors (or other terminating devices) at the ends of the bus. It does not introduce any single point of failure in the network. For example, if the network is cut in the middle, both parts of the network may still operate as two separate stand-alone networks. It has high availability and reliability in the harsh railway -environment. It may adapt its throughput per the quality of the cable, the noise, the number of devices on the network, etc. It provides good galvanic isolation. It is able to adapt to arbitrary topologies without degradation of performance. It provides privacy of the physical medium. The system may be used for applications that require large amounts of bandwidth on-board trains, on-board other public transit vehicles or in the wayside environment. The system is able to support multiple signals (for several applications) over the same two-conductor cable. The system is able to support critical and non-critical applications, such as train monitoring and management, train/destination identification, next stop and connection announcements, broadcast of audio and visual emergency messages, passenger emergency intercom, media entertainment and advertising broadcasting (web-like content), trainborne CCTV video streaming to the wayside, platform CCTV video streaming to the trains, in-seat information/entertainment and interactive Internet/Intranet access, etc. It is economic.

Figure 3:
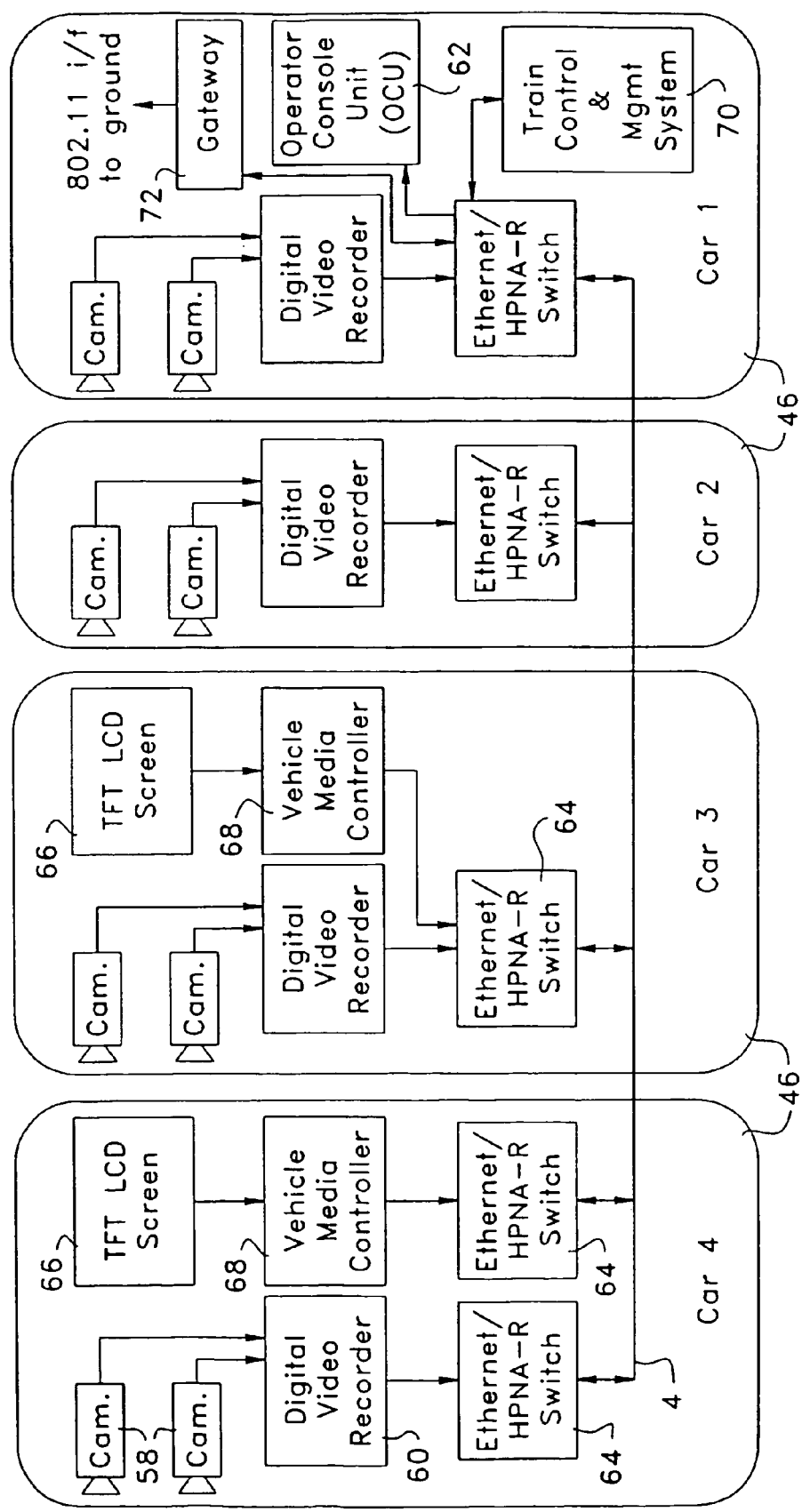
FIG. 3 is a schematic diagram showing applications with the disclosed network system.

Referring to FIG. 3, there is shown an example of the disclosed system used for a CCTV (closed-circuit television) video surveillance application. In the illustrated case, the train has four cars 46. Two cameras 58 and one Digital Video Recorder (DVR) 60 are installed in each car 46. In each car 46 of the train, the images from the cameras 58 are digitized and recorded on the DVR 60. Simultaneously, the DVR 60 sends the images to an Operator Console Unit (OCU) 62 located in Car 1 through the train backbone network 4, to allow the train driver to see what is happening inside each car 46. Sending images (even compressed) from several cameras 58 continuously through a network 4 requires a large amount of bandwidth. A network 4 able to support a data rate of 10 Mbps would be suitable for this application. In the illustrated configuration, Ethernet/HomePNA-R switches 64 (HomePNA-R standing for HomePNA-Ruggedized, i.e. including a ruggedized analog front-end as described above) form the access devices 44 (as shown in FIG. 1). The DVRs 60 form the controllers 54 (as shown in FIG. 1). The cameras 58 form the application units 52 (as shown in FIG. 1). The OCU 62 forms another controller/application unit connected to the network 4.

The analog front-ends in the switches 64 increase the signal-to-noise (S/N) ratio using the amplifier 20 (as shown in FIG. 5), increase the common mode filtering and add more high energy spikes protection. The analog front-ends do not affect the bit rate, reduce sensitivity to EMI field by 20 dB and provide more differential protection than the original design.

The Ethernet/HomePNA-R switches 64 may be in a stand-alone module or integrated within the DVRs 60. In the case where the DVRs have Ethernet interfaces like the majority of computers and controllers on the market, the conversion functionality of the switches 64 is used for conversion between the Ethernet protocol and the HomePNA network protocol. If several Ethernet devices are connected to a same Ethernet/HomePNA-R switch 64, as in Car 1, the switch 64 may switch between the signals of the different Ethernet devices. For example, the OCU 62 may be formed of a touch screen computer (not shown) with an Ethernet interface. Thus, it may be connected to the same Ethernet/HomePNA-R Switch as the DVR 60 of the car. The Ethernet/HomePNA-R switches 64 allow any IP device with an Ethernet interface to be connected to the HomePNA-R bus 4. The Ethernet/HomePNA-R switches 64 do not introduce a single point of failure. For example, if the switch 64 in Car 4 fails, the DVRs 60 in Car 3, Car 2 and Car 1 will still be able to send images to the OCU 62. The DVRs 60 may be arranged to receive analog signals from the cameras 58, convert the signals into digital, compress the signals, store them on a hard disk, and also send them to the OCU 62.

As another example, a multimedia broadcasting application may be implemented on the disclosed system. A thin film transistor liquid crystal display (TFT LCD) screen 66 and a vehicle media controller (VMC) 68 may be installed in certain cars. The VMCs 68 are controllers which may store media content, advertisements, next station/connection announcements, emergency messages, etc. The VMCs 68, like most of the controllers on the market, may have an Ethernet interface. The VMCs 68 communicate with the train control and management system 70 to obtain information about the train location. This allows the VMCs 68 to send the appropriate next station/connection announcements to the TFT LCD displays 66. When the train is in a depot or in some specific stations, the VMCs 68 may communicate with the ground via a gateway 72 to update its multimedia messages.

The system may be adapted to use a single VMC 68 for the entire train. The TFT LCD screens 66 would have to be connected to the single VMC 68 via a suitable mechanism (not shown).

Figure 4:
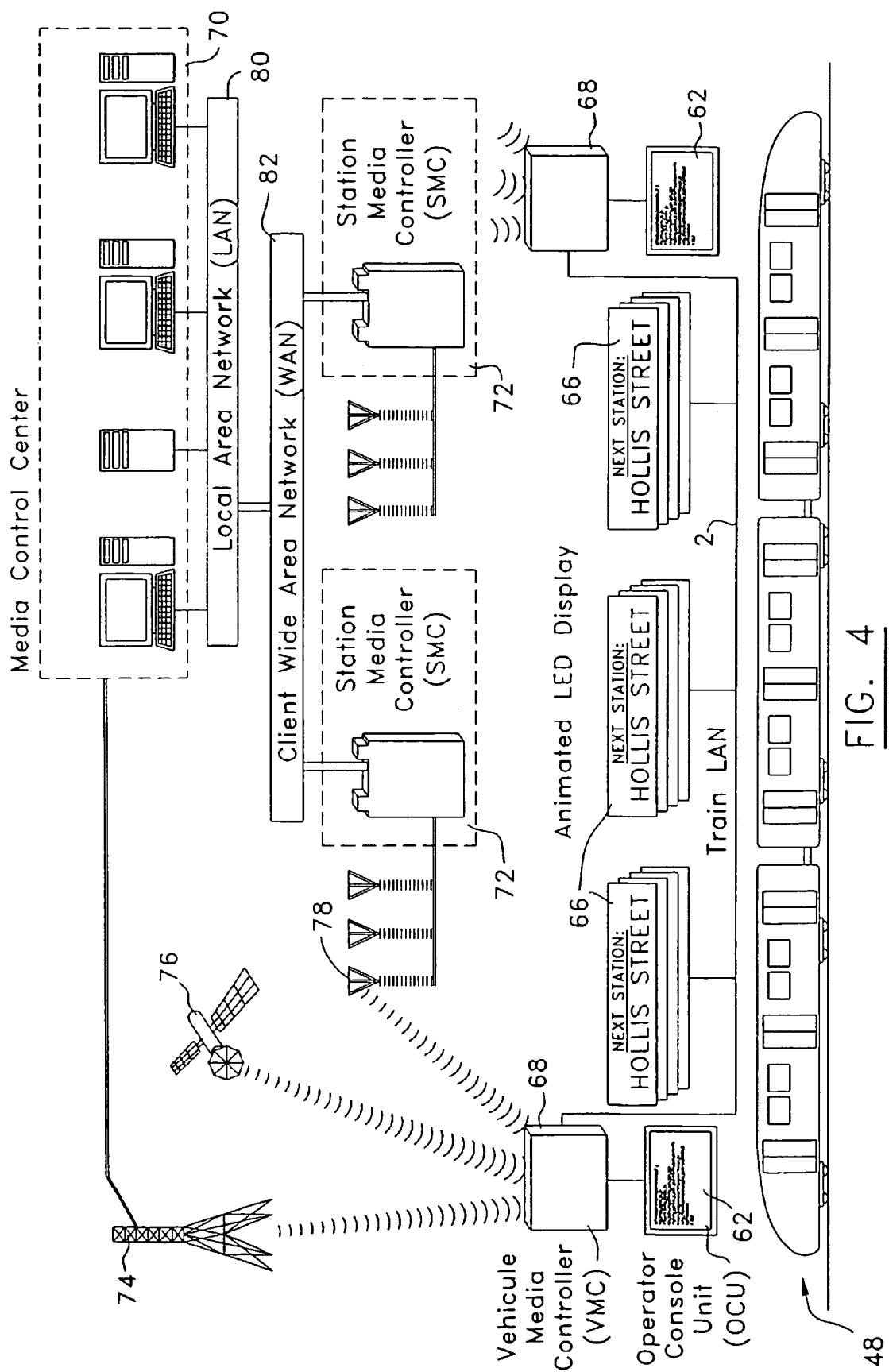
FIG. 4 is a schematic diagram showing a LED Multimedia broadcasting application with the disclosed network system.

FIG. 4 shows another multimedia application whereby all the displays 66 (e.g. animated LED displays) are connected directly to the network 2. The displays 66 have embedded interfaces to the network 2. In the illustrated configuration, the train 48 has two VMCs 68 for redundancy purposes (one would be sufficient). The VCMs 68 may communicate with a media control center (MCC) 70 and station media controllers (SMCs) 72 through a pager/cellular/private radio network 74, a GPS 76, multiple radio nodes 78 or other communication devices. The SMCs 72 may be connected with the MCC 70 through a local area network (LAN) 80 and/or a client wide area network (WAN) 82.

While embodiments of this invention have been illustrated in the accompanying drawings and described above, it will be evident to those skilled in the art that changes and modifications may be made therein without departing from the essence of this invention. For example, the disclosed system may be implemented using BPL (Broadband over Power Line) technology, i.e. through a two-conductor cable of a power line. In such case, the network communicative devices would be power line communication compliant devices, e.g. compliant with HomePlug specifications.

The invention claimed is:

1. A ruggedized analog front-end for interconnecting a network communicative device to a two-conductor based network, comprising:
  input and output leads for connection to the network communicative device;
  network leads for connection to the two-conductor based network;
  a coupling circuit having first, second and third terminal sets, a first coupling channel between the first and second terminal sets, and a second coupling channel between the first and third terminal sets, the first and second coupling channels providing isolation, impedance matching and energy transfer between corresponding ones of the terminal sets;
an amplifier having an input connected to the input leads, and an output connected to the second terminal set of the coupling circuit;
a common mode filter circuit coupled between the first terminal set of the coupling circuit and the network leads;
an attenuator having an input connected to the third terminal set of the coupling circuit, and an output connected to the output leads;
and a power supply circuit for operative power supply of electronic components of the analog front-end.

2. The ruggedized analog front-end according to claim 1, wherein the coupling circuit comprises a transformer having a primary coil and first and second secondary coils, the primary coil being connected to the first terminal set, the first and second secondary coils being connected respectively to the second and third terminal sets, the transformer providing the first and second coupling channels.

3. The ruggedized analog front-end according to claim 1, wherein the first and second coupling channels comprise opto-isolated amplifiers.

4. The ruggedized analog front-end according to claim 1, wherein the amplifier comprises a differential amplifier for amplifying a voltage difference between two input signals received by the input leads.

5. The ruggedized analog front-end according to claim 1, further comprising a protection circuit coupled between the output of the amplifier and the second terminal set of the coupling circuit.

6. The ruggedized analog front-end according to claim 5, wherein the protection circuit comprises a circuit arrangement having diodes and capacitors.

7. The ruggedized analog front-end according to claim 1, further comprising a protection circuit coupled between the input of the attenuator and the third terminal set of the coupling circuit.

8. The ruggedized analog front-end according to claim 7, wherein the protection circuit comprises a circuit arrangement having diodes and capacitors.

9. The ruggedized analog front-end according to claim 1, further comprising a band pass filter coupled between the first terminal set of the coupling circuit and the common mode filter circuit.

10. The ruggedized analog front-end according to claim 9, wherein: the coupling circuit comprises a transformer having a primary coil and first and second secondary coils, the primary coil being connected to the first terminal set, the first and second secondary coils being connected respectively to the second and third terminal sets, the transformer providing the first and second coupling channels;
and the band pass filter and the transformer are combined together into a chip powered by the power supply circuit.

11. The ruggedized analog front-end according to claim 1, wherein the common mode filter circuit comprises a low frequency common mode filter connected to a high frequency common mode filter.

12. The ruggedized analog front-end according to claim 1, further comprising a protection circuit coupled between the common mode filter circuit and the network leads.

13. The ruggedized analog front-end according to claim 12, wherein the protection circuit comprises a circuit arrangement having zenner diodes for protection in differential mode of signals sent to and received from the two-conductor based network.

14. A network system operable in a harsh environment, comprising:
a pair of conductors forming at least a part of a two-conductor based network;
at least one network communicative device;
and at least one access device interconnectable between the pair of conductors and the at least one network communicative device, the at least one access device having a ruggedized analog front-end as defined in claim 1.

15. The network system according to claim 14, wherein the harsh environment comprises train vehicles.

16. The network system according to claim 14, wherein the pair of conductors has at least one end provided with a connector for connection with a like pair of conductors of the two-conductor based network.

17. The network system according to claim 14, wherein the at least one network communicative device comprises multiple network communicative devices and the at least one access device comprises multiple access devices each interconnectable between the pair of conductors and a number of the network communicative devices.

18. The network system according to claim 14, wherein the at least one network communicative device comprises an application unit connectable to the access device, for performing an application.

19. The network system according to claim 18, wherein the network communicative device further comprises a controller for communication of data between the application unit arid the two-conductor based network.

20. The network system according to claim 18, wherein the network communicative device further comprises a controller controlling operation of the application unit in response to control signals received on the two-conductor based network.

21. The network system according to claim 18, wherein the at least one access device has a conversion functionality for conversion between communication protocols used by the network communicative device and over the two-conductor based network.

22. The network system according to claim 18, wherein the at least one access device has a switching functionality for communication between the network communicative device and additional network communicative devices connected to the at least one access device.

23. The network system according to claim 14, wherein the at least one network communicative device comprises a HomePNA device.

24. The network system according to claim 14, wherein the at least one network communicative device comprises a power line communication compliant device.

* * * * *